United States Patent
Luo

(10) Patent No.: US 12,012,159 B2
(45) Date of Patent: Jun. 18, 2024

(54) ELECTRIC POWER STEERING CONTROL METHOD, ELECTRIC POWER STEERING SYSTEM, AND STORAGE MEDIUM

(71) Applicant: GUANGZHOU AUTOMOBILE GROUP CO., LTD., Guangzhou (CN)

(72) Inventor: Hua Luo, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 219 days.

(21) Appl. No.: 17/756,706

(22) PCT Filed: Jun. 1, 2021

(86) PCT No.: PCT/CN2021/097641
§ 371 (c)(1),
(2) Date: May 31, 2022

(87) PCT Pub. No.: WO2021/244520
PCT Pub. Date: Dec. 9, 2021

(65) Prior Publication Data
US 2023/0159094 A1 May 25, 2023

(30) Foreign Application Priority Data
Jun. 5, 2020 (CN) .......................... 202010506422.1

(51) Int. Cl.
*B62D 5/04* (2006.01)
(52) U.S. Cl.
CPC ......... *B62D 5/0481* (2013.01); *B62D 5/0463* (2013.01)
(58) Field of Classification Search
CPC .................. B62D 5/0463; B62D 5/0481
See application file for complete search history.

(56) References Cited

U.S. PATENT DOCUMENTS 10,435,024 B2 * 10/2019 Akatsuka ............. G05D 1/0061
10,661,826 B2 * 5/2020 Matsuo ................ B62D 5/0466
(Continued)

FOREIGN PATENT DOCUMENTS

CN  105946966 A  9/2016
CN  206141615 U  5/2017
(Continued)

OTHER PUBLICATIONS

First Office Action mailed to Corresponding Chinese Patent Application No. 202010506422.1 dated Apr. 25, 2022.

*Primary Examiner* — Long T Tran
(74) *Attorney, Agent, or Firm* — Hodgson Russ LLP

(57) ABSTRACT

An electric power steering control method. Said method comprises the following steps executed by an EPS system: acquiring an expected control signal sent by an LKA system, the expected control signal comprising an expected angle signal or an expected torque signal; on the basis of vehicle configuration codes, performing compatibility verification on the expected control signal, and acquiring a compatibility verification result; and if the compatibility verification result indicates being compatible, acquiring a target torque value according to the expected control signal, and controlling steering of a power-assisted motor on the basis of the target torque value. Said method uses vehicle configuration codes to perform compatibility verification on expected control signals corresponding to different interface types, and when a compatibility verification result indicates being compatible, controls the operation of a power-assist motor according to a target torque value determined by the expected control signal.

20 Claims, 4 Drawing Sheets

(56) References Cited

U.S. PATENT DOCUMENTS

| | | | |
|---|---|---|---|
| 11,097,770 B2* | 8/2021 | Minaki | B62D 5/0463 |
| 2004/0262063 A1* | 12/2004 | Kaufmann | B62D 15/025 |
| | | | 180/169 |
| 2016/0244056 A1 | 8/2016 | Seguchi | |
| 2016/0325780 A1* | 11/2016 | She | B62D 5/0472 |
| 2019/0039648 A1* | 2/2019 | Kitta | B62D 5/0463 |
| 2019/0161116 A1* | 5/2019 | Moreillon | B62D 15/025 |
| 2019/0241210 A1* | 8/2019 | Nolden | B62D 1/286 |
| 2019/0315403 A1* | 10/2019 | Irie | B62D 1/286 |
| 2020/0010111 A1* | 1/2020 | Tsubaki | B62D 5/0463 |
| 2020/0324808 A1* | 10/2020 | Kodera | B62D 6/007 |
| 2020/0346642 A1* | 11/2020 | Varunjikar | B60W 30/12 |
| 2021/0245796 A1* | 8/2021 | Aoki | B62D 1/286 |

FOREIGN PATENT DOCUMENTS

| | | |
|---|---|---|
| CN | 106938661 A | 7/2017 |
| CN | 108569335 A | 9/2018 |
| CN | 109532830 A | 3/2019 |
| CN | 109625079 A | 4/2019 |
| CN | 110171468 A | 8/2019 |
| CN | 111175056 A | 5/2020 |
| JP | 2006044563 A | 2/2006 |
| JP | 2013233930 A | 11/2013 |
| JP | 2019123475 A | 7/2019 |

\* cited by examiner

ELECTRIC POWER STEERING CONTROL METHOD, ELECTRIC POWER STEERING SYSTEM, AND STORAGE MEDIUM

CROSS-REFERENCE TO RELATED APPLICATIONS

This application is the 371 application of PCT Application No. PCT/CN2021/097641, filed on Jun. 1, 2021, which is based upon and claims priority to Chinese Patent Application No. 202010506422.1, filed Jun. 5, 2020, the entire contents of which are incorporated herein by reference.

TECHNICAL FIELD

The present application relates to the technical field of vehicle control, and more particularly, to an electric power steering control method, an electric power steering system and a storage medium.

BACKGROUND

The Electric Power Steering system (hereinafter referred to as EPS system) is a power steering system that directly relies on a motor to provide an auxiliary torque. The Lane Keeping Assist system (hereinafter referred to as LKA system) belongs to one of intelligent driving assistance systems, which is specifically a system for controlling a control and coordination device of the brakes, and is configured to support the vehicle in the lane by identifying the markings of the driving lane by a camera while the vehicle is driving.

On existing vehicles, when the LKA system controls and implements an active assisted steering, there are usually two interface types for the interaction between the EPS system and the LKA system: one is an angle interface, that is, the EPS system receives an expected angle signal of the LKA system, and performs an active steering assist operation based on the expected angle signal, in which the expected angle signal is a signal that is expected to control the steering wheel angle. The other is a torque interface, that is, the EPS system receives an expected torque signal from the LKA system, and performs an active steering assist operation based on the expected torque signal, in which the expected torque signal is a signal that is expected to control the steering wheel torque. The current EPS system and the current LKA system based on the angle interface or the torque interface are incompatible in a development process, so that it necessary to develop a new application software to switch interface types, which is costly and inefficient. When functional requirements or test requirements needs to be used on a vehicle with different configurations in the same project, the EPS system and the LKA system are used to interact with the LKA system through different interfaces, which it is impossible to switch directly. Therefore, two different versions of application software need to be developed, making the software development cost high and less efficient.

SUMMARY

There are provided an electric power steering control method, an electric power steering system and a storage medium according to embodiments of the present disclosure. The technical solution is as below:

According to a first aspect of embodiments of the present disclosure, there is provided an electric power steering control method, executed by an Electric Power Steering (EPS) system, comprising:
acquiring an expected control signal sent by a Lane Keeping Assist (LKA) system, wherein the expected control signal comprises an expected angle signal or an expected torque signal;
performing a compatibility verification on the expected control signal based on a vehicle configuration code, and obtaining a compatibility verification result; and
obtaining a target torque value according to the expected control signal, and controlling an assist motor steering based on the target torque value, if the compatibility verification result is compatible.

According to a second aspect of embodiments of the present disclosure, there is provided an electric power steering system, comprising:
an EPS memory;
a processor; and
computer-readable instructions stored in the EPS memory and executed on the processor;
wherein when the processor executes the computer-readable instructions, the following steps are implemented:
acquiring an expected control signal sent by a LKA system, wherein the expected control signal comprises an expected angle signal or an expected torque signal;
performing a compatibility verification on the expected control signal based on a vehicle configuration code, and obtaining a compatibility verification result; and
obtaining a target torque value according to the expected control signal, and controlling an assist motor steering based on the target torque value, if the compatibility verification result is compatible.

According to a third aspect of embodiments of the present disclosure, there is provided a non-transitory computer-readable medium, having stored therein computer-readable instructions, wherein when the computer-readable instructions are executed by one or more processors, the one or more processors perform the following steps:
acquiring an expected control signal sent by a LKA system, wherein the expected control signal comprises an expected angle signal or an expected torque signal;
performing a compatibility verification on the expected control signal based on a vehicle configuration code, and obtaining a compatibility verification result; and
obtaining a target torque value according to the expected control signal, and controlling an assist motor steering based on the target torque value, if the compatibility verification result is compatible.

BRIEF DESCRIPTION OF THE DRAWINGS

In order to illustrate technical solutions of embodiments of the present application more clearly, the drawings that are used in the description of the embodiments of the present application will be introduced briefly as follows. Obviously, the drawings in the following description are only some embodiments of the present application, for those of ordinary skill in the art, other drawings may also be obtained from these drawings without creative labor.

DETAILED DESCRIPTION

The technical solutions in the embodiments of the present application will be clearly and completely described below with reference to the drawings in the embodiments of the present application. Obviously, the described embodiments are part of the embodiments of the present application, but not all of the embodiments. Based on the embodiments in the present application, all other embodiments obtained by those of ordinary skill in the art without creative work fall within the protection scope of the present application.

Figure 1:
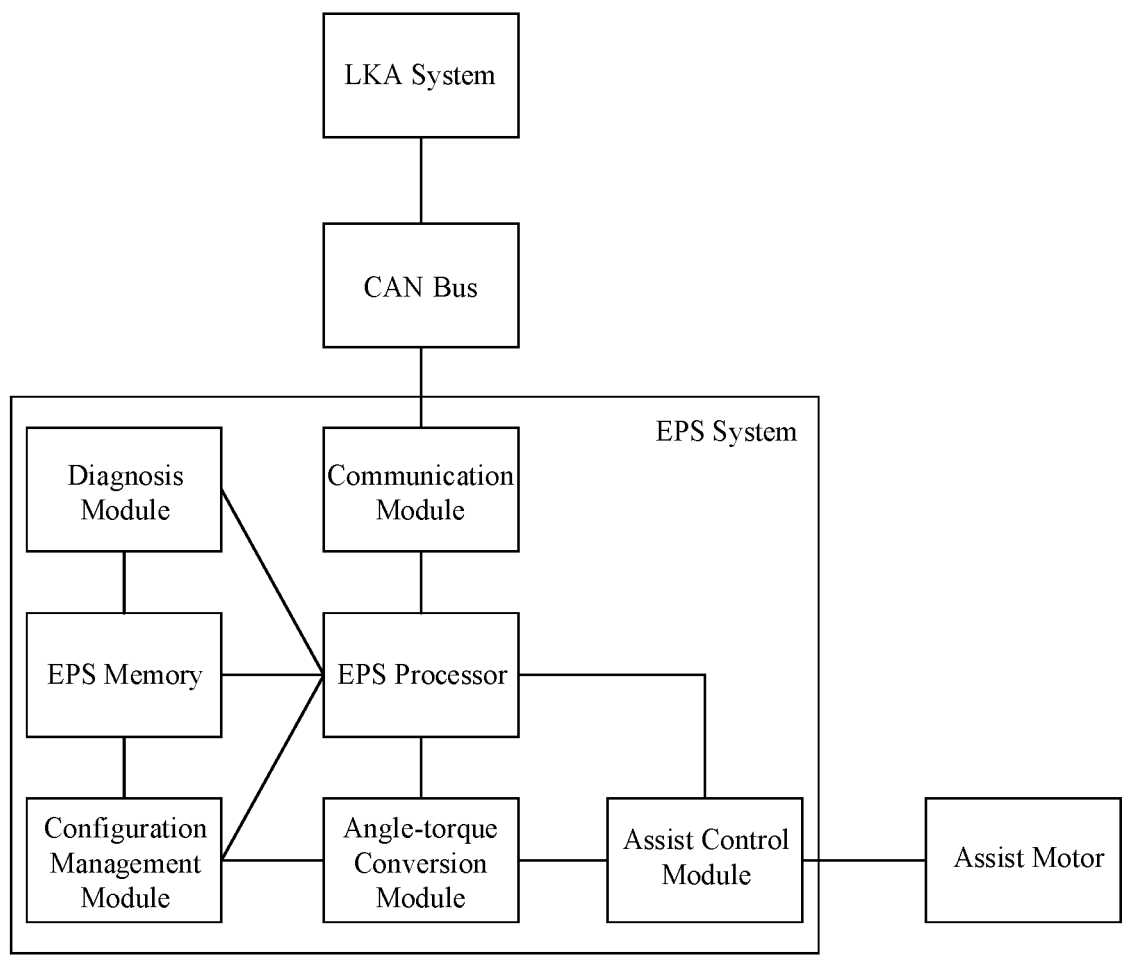
FIG. 1 illustrates an electric power steering system according to an embodiment of the present application.

The electric power steering control method provided by the embodiment of the present application may be applied in the application environment shown in FIG. 1. Specifically, the electric power steering control method is applied in an Electric Power Steering system (hereinafter referred to as EPS system), and the EPS system is communicated with the LKA system through a Controller Area Network (CAN) bus, so that the EPS system can receive an expected control signal sent by the LKA system through the CAN bus to perform active steering assist operations. It can be understood that the expected control signal triggered by the LKA system may be either an expected angle signal or an expected torque signal. A compatibility verification is performed on the expected control signal triggered by the LKA system by a pre-written vehicle configuration code. When a compatibility verification result is compatible, a target torque value is obtained according to the expected control signal, so as to control an assist motor steering based on the target torque value, so that the EPS system can process the expected angle signal or the expected torque signal triggered by the LKA system to achieve the compatibility of application software. There is no need to develop two application softwares corresponding to different interface types, which helps to reduce software development costs.

The LKA system is configured to detect whether there is a lane departure. In the case of a lane departure, a steering control right of the EPS system is obtained. The LKA system may calculates the expected angle value or the expected torque value according to signals such as different interface types, current vehicle speed and lane departure degree, so as to generate two expected control signals, including the expected angle signal or the expected torque signal. The expected angle value is an expected value that the LKA system determines a steering angle that needs to be controlled, by processing control parameters such as the current vehicle speed and the degree of lane departure according to the deviation steering control logic corresponding to the angle interface. The expected torque value is an expected value that the LKA system determines the expected value of the steering torque that needs to be controlled, by processing the control parameters such as the current vehicle speed and the degree of lane departure according to the deviation steering control logic corresponding to the torque interface. The expected control signal is a signal sent by the LKA system to the EPS system configured to control the EPS system to perform a steering operation. The expected angle signal is a signal sent by the LKA system to the EPS system configured to control the EPS system to perform a steering operation according to the expected angle value. The expected torque signal is a signal sent by the LKA system to the EPS system configured to control the EPS system to perform a steering operation according to the expected torque value. The deviation steering control logic is preset by the LKA system to process control parameters such as the current vehicle speed and the degree of lane departure detected in real time, so as to form the processing logic for controlling the EPS system.

The CAN bus is a bus configured to realize a signal transmission between the LKA system and the EPS system. The CAN bus may also be connected to an upper computer, so that the user can control the EPS system through the upper computer to complete a writing operation of the vehicle configuration code, so as to store the vehicle configuration code in the EPS system.

The assist motor is a motor connected to the EPS system and configured to output a steering power under a control of the EPS system.

As shown in FIG. 1, the EPS system includes an EPS processor, a communication module connected to the EPS processor, a diagnosis module, an EPS memory, a configuration management module, an angle-torque conversion module and an assist control module. The communication module is connected to the LKA system through the CAN bus. The assist control module is connected to an assist motor module.

The EPS processor is a controller in the EPS system, having a built-in assist power steering control logic for controlling the operation of the assist motor, which can control the assist motor to complete a steering operation by executing the power steering control logic. The power steering control logic is a processing logic that a target torque value is determined according to an expected control signal of the LKA system preset by the EPS system, so as to control the operation of the assist motor according to the target torque value.

The communication module is configured to realize a communication between the EPS system and the CAN bus, which is specifically a module communicated with the LKA system through the CAN bus. For example, the communication module can receive a handshake signal and an expected control signal sent by the LKA system, and send the handshake signal and the expected control signal to a controller of the EPS system. The handshake signal is a signal triggered by the LKA system for the EPS system to implement a communication handshake function. The expected control signal is a signal sent by the LKA system to the EPS system configured to control the EPS system to perform a steering operation.

The diagnosis module is a module configured to complete configuration and writing functions of the vehicle configuration code. In this embodiment, after the vehicle is offline, through the Vehicle Spy or other CAN development or testing tools, a configuration of the vehicle configuration code is completed by a diagnostic service provided by the diagnosis module, that is, a reading and writing operation of the vehicle configuration code may be performing by the diagnostic service in the diagnosis module through the CAN bus. The vehicle configuration code is a code configured by the user configured to control an interaction between the EPS system and the LKA system.

In this embodiment, the vehicle configuration code includes a LKA function identifier and a LKA interface identifier. The LKA function identifier is an identifier configured to define whether to enable the LKA function, and the LKA function identifier includes an on identifier and an off identifier. For example, O and F may be configured to denote the on identifier and the off identifier, respectively. Thus, after recognizing the on identifier, the EPS turns on the LKA function and communicates with the LKA system. After recognizing the off identifier, the EPS turns off the LKA function and does not communicate and interact with the LKA system. The LKA interface identifier is an identifier configured to define an interface capable of interacting between the EPS system and the LKA system. The LKA interface identifier includes an angle interface identifier and a torque interface identifier. For example, Model 1 and Model 2 may be configured to represent the angle interface identifier and the torque interface identifier, respectively. In this embodiment, when the LKA interface identifier in the vehicle configuration code is the angle interface identifier, the EPS system can process the expected angle signal uploaded by the LKA system to obtain the target torque value, and then control the assist motor steering according to the target torque value. When the LKA interface identifier in the vehicle configuration code is the torque interface identifier, the EPS system can process the expected torque signal uploaded by the LKA system to obtain the target torque value, and then control the assist motor steering according to the target torque value.

The EPS memory is a device configured to store data, which can store the vehicle configuration code configured by the user through the diagnosis module in advance, so as to complete a communication between the EPS system and the LKA system through the angle interface or the torque interface by the vehicle configuration code.

The configuration management module is configured to read the vehicle configuration code pre-stored in the EPS memory after the EPS system is powered on, and determine whether to control the angle-torque conversion module to turn on according to the vehicle configuration code.

The angle-torque conversion module is a module configured to realize a conversion between a steering wheel angle and a steering wheel torque, that is, a module with a built-in angle-torque conversion algorithm. The angle-torque conversion algorithm is a preset algorithm for the conversion between the steering wheel angle and the steering wheel torque, and the angle-torque conversion algorithm may be a linear algorithm or other algorithms capable of realizing the conversion between the steering wheel angle and the steering wheel torque.

Generally speaking, if the LKA interface identifier in the vehicle configuration code is the angle interface identifier, the angle-torque conversion module needs to be turned on, the expected angle signal sent by the LKA system is processed to obtain the target torque value, and then the assist motor steering is controlled according to the target torque value. If the LKA interface identifier in the vehicle configuration code is the torque interface identifier, there is no need to turn on the angle-torque conversion module, and the expected torque signal sent by the LKA system can be processed directly to obtain the target torque value, and then the assist motor steering is controlled according to the target torque value.

The power assist control module is a module configured to drive the assist motor to perform a steering operation according to a predetermined strategy according to the target torque value.

Figure 2:
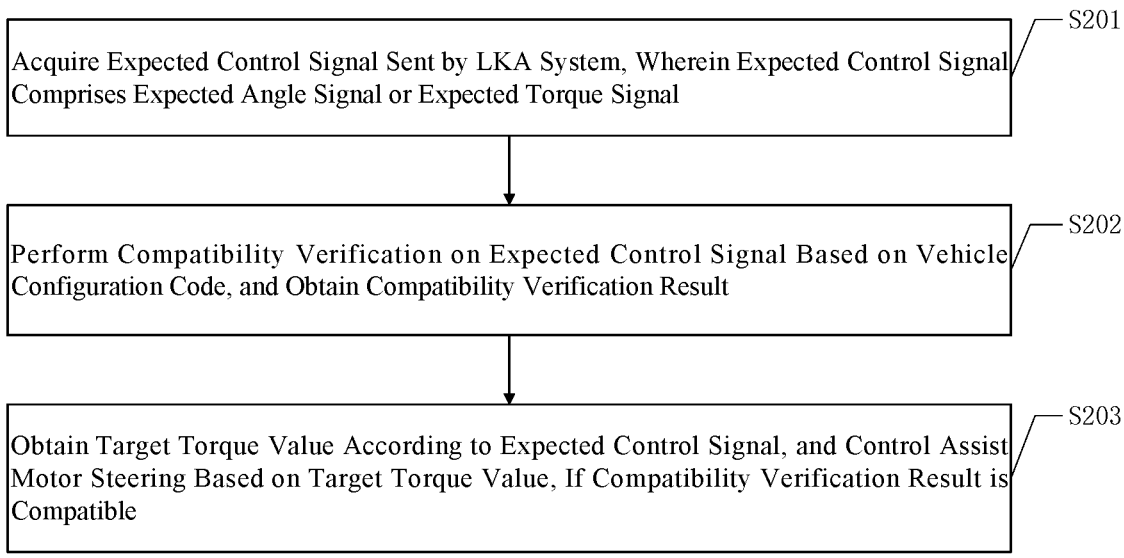
FIG. 2 is a flowchart of an electric power steering control method according to an embodiment of the present application.

In one embodiment, as shown in FIG. 2, provided is an electric power steering control method, which is applied to the EPS system in FIG. 1 as an example for description, and specifically includes the following steps performed by the EPS system.

S201: an expected control signal sent by the LKA system is acquired, wherein the expected control signal includes an expected angle signal or an expected torque signal.

The expected control signal is a signal sent by the LKA system to the EPS system configured to control the EPS system to perform a steering operation.

In one embodiment, the expected control signal may be an expected angle signal, so that the EPS system controls an assist motor to perform the steering operation according to the expected angle signal. The expected angle signal is a signal sent by the LKA system to the EPS system configured to control the EPS system to perform the steering operation according to the expected angle value, that is, a signal configured to control a steering angle of the assist motor. The expected angle value is an expected value that the LKA system determines a steering angle that needs to control the steering wheel after processing the control parameters such as a current vehicle speed and a degree of lane departure according to a deviation steering control logic corresponding to an angle interface.

In another embodiment, the expected control signal may be an expected torque signal, so that the EPS system controls the assist motor to perform a steering operation according to the expected torque signal. The expected torque signal is a signal sent by the LKA system to the EPS system configured to control the EPS system to perform the steering operation according to the expected torque value, that is, a signal configured to control a steering torque of the assist motor. The expected torque value is an expected value that the LKA system determines a steering torque that needs to control the steering wheel, after processing the control parameters such as the current vehicle speed and the degree of lane departure according to the deviation steering control logic corresponding to the torque interface.

S202: a compatibility verification is performed on the expected control signal based on the vehicle configuration code, and a compatibility verification result is obtained.

The vehicle configuration code is a code configured by the user and configured to control an interaction between the EPS system and the LKA system. In this embodiment, the EPS system may pre-write the vehicle configuration code through the diagnosis module, and store the vehicle configuration code in the EPS memory. When needed, the vehicle configuration code in the EPS memory may be read through the configuration management module or other reading tools. The vehicle configuration code includes a LKA function identifier and a LKA interface identifier. The LKA function identifier is an identifier configured to define whether to enable the LKA function. The LKA function identifier includes an on identifier and an off identifier. The LKA interface identifier is configured to define an identifier corresponding to an interface capable of interacting between the EPS system and the LKA system. The LKA interface identifier includes an angle interface identifier and a torque interface identifier.

In this embodiment, the compatibility verification is performed on the expected control signal based on the vehicle configuration code, so as to obtain the compatibility verification result. Specifically, whether the EPS system has enabled the LKA function is determined according to the LKA function identifier and LKA interface identifier in the pre-configured vehicle configuration code, and whether the communication interface between the EPS system and the LKA system is compatible is determined, so as to obtain the compatibility verification result. It can be understood that, whether the EPS system has enables the LKA function and whether the EPS system is compatible with the angle interface and the torque interface can be determined based on the vehicle configuration code pre-stored by the EPS system, so as to realize the compatibility verification on the expected control signal sent by the LKA system and obtain the compatibility verification result. The compatibility verification result includes compatibility and incompatibility. Compatibility means that interface types that are configured to communicate with the LKA system and the EPS system are compatible, and incompatibility means that the interface types that are configured to communicate with the LKA system and the EPS system are incompatible.

In an embodiment, before step S101, the vehicle configuration code needs to be written to the EPS system in advance before obtaining the expected control signal sent by the LKA system, that is, a configuration of the vehicle configuration code is completed through a diagnosis module of the EPS system, and the vehicle configuration code is stored in an EPS memory, so that the EPS system can perform the compatibility verification on the expected control signal sent by the LKA system according to the vehicle configuration code, thereby ensuring that the LKA system and the EPS system can communicate with different interface types. It can be understood that, when it is necessary to switch the interface type for the communication between the EPS system and the LKA system, it is only necessary to modify the LKA function identifier and LKA interface identifier written in the vehicle configuration code in the EPS system, without additional development of new application software, which helps to reduce software development costs and development cycles.

S203: if the compatibility verification result is compatible, the target torque value is obtained according to the expected control signal, and an assist motor steering is controlled based on the target torque value.

The target torque value is a torque obtained by conversion according to the expected control signal of the LKA system, which is configured to control an operation of the assist motor.

In this embodiment, when the compatibility verification result is compatible, the EPS system can call a power steering control logic corresponding to the interface type according to the interface type corresponding to the expected control signal, and process the expected control signal to obtain the target torque value, and then control the assist motor steering according to the target torque value. For example, the calculated target torque value and the current vehicle speed and current torque value collected in real time are calculated and processed to control the assist motor to output an assist power, so as to realize an active assist steering operation.

In the electric power steering control method provided in this embodiment, the EPS system may receive an expected control signal sent by the LKA system, and the expected control signal may be an expected angle signal formed based on an angle interface, or an expected torque signal formed based on a torque interface. A compatibility verification is performed on the expected control signal by the vehicle configuration code pre-stored in the EPS system, to determine whether the interface types of the EPS system and the LKA system are compatible according to the compatibility verification result. When the compatibility verification result is compatible, the target torque value is determined according to the expected control signal, so as to control the assist motor steering according to the target torque value. It can be understood that, the compatibility verification is performed on the expected control signals corresponding to different interface types by the vehicle configuration code. When the compatibility verification result is compatible, the assist motor is controlled to work according to the target torque value determined by the expected control signal, so as to achieve an interaction between the LKA system and the EPS system by the vehicle configuration code to switch different interface types, without a development of application software corresponding to different interface types, which helps to reduce software development costs and development cycles.

In an embodiment, obtaining the target torque value according to the expected control signal in step S202 specifically includes the following steps. If the expected control signal is the expected angle signal, the expected angle value is obtained according to the expected angle signal, and a conversation is performed on the expected angle by an angle-torque conversion algorithm, so as to obtain the target torque value.

In this embodiment, when the expected control signal received by the EPS system is the expected angle signal, and the compatibility verification result is compatible, it is indicated that the LKA function identifier of the vehicle configuration code is the on identifier, and the LKA interface identifier is the angle interface identifier. In this circumstance, the received expected angle signal is firstly processed to determine the expected angle value corresponding to the expected angle signal, which can be understood as an expected value expected value of a steering wheel angle that needs to be controlled by the assist motor. Then, a preset angle-torque conversion algorithm is configured to convert the expected angle value to obtain the target torque value, thereby controlling the assist motor steering according to the target torque value. The angle-torque conversion algorithm is a preset algorithm for the conversion between the steering wheel angle and the steering wheel torque, and the angle-torque conversion algorithm may be a linear algorithm or other algorithms capable of realizing the conversion between the steering wheel angle and the steering wheel torque.

In another embodiment, obtaining the target torque value according to the expected control signal in step S202 specifically includes the following steps. If the expected control signal is the expected torque signal, the expected torque value is obtained according to the expected torque signal, and the expected torque value is determined as the target torque value.

In this embodiment, when the expected control signal received by the EPS system is the expected torque signal, and the compatibility verification result is compatible, it is indicated that the LKA function identifier of the vehicle configuration code is the on identifier, and the LKA identifier is the torque interface identifier. In this circumstance, the received expected torque signal may be processed to determine the expected torque value corresponding to the expected torque signal, and the expected torque value is determined as the target torque value, thereby controlling the assist motor steering according to the target torque value. That is, when the expected control signal is the expected torque signal, the assist motor steering may be controlled according to the obtained target torque value without using the angle-torque conversion algorithm for conversion processing.

In an embodiment, each time the EPS system is powered on, the vehicle configuration code in the EPS memory needs to be read first, that is, the vehicle configuration code in the EPS memory is read through the configuration management module and stored in a cache, so that the expected control signal can be quickly verified for compatibility according to the vehicle configuration code while receiving the expected control signal triggered by the LKA system, thereby effectively improving an efficiency of the compatibility verification. In an embodiment, when the LKA function identifier of the vehicle configuration code read by the configuration management module is the on identifier and the LKA interface identifier is the angle interface identifier, the angle-torque conversion module needs to be turned on, so as to call the angle-torque conversion algorithm for subsequent processing. When the LKA function identifier of the vehicle configuration code read by the configuration management module is the on identifier, and the LKA interface identifier is the torque interface identifier, there is no need to turn on the angle-torque conversion module, that is, there is no need to call the angle-torque conversion algorithm for subsequent processing. Therefore, the compatibility verification of different interface types can be realized based on the vehicle configuration, so that the expected control signals of different interface types can be processed with a set of application software, which helps to reduce software development costs and development cycles.

Figure 3:
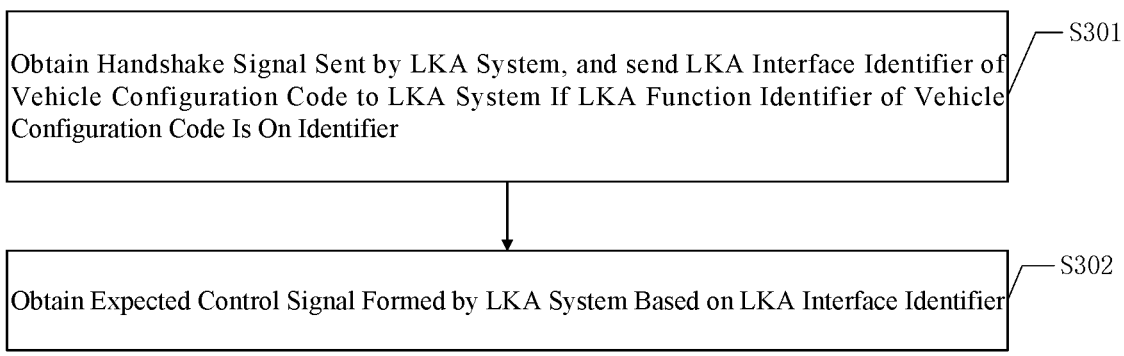
FIG. 3 is another flowchart of the electric power steering control method according to an embodiment of the present application.

In one embodiment, as shown in FIG. 3, acquiring the expected control signal sent by the LKA system in step S201 specifically includes the following steps.

S301: a handshake signal sent by the LKA system is acquired, and if the LKA function identifier of the vehicle configuration code is the on identifier, the LKA interface identifier of the vehicle configuration code is sent to the LKA system.

S302: the expected control signal formed by the LKA system is obtained based on the LKA interface identifier.

The handshake signal is a request triggered by the LKA system configured to establish a communication relationship between the LKA system and the EPS system.

In this embodiment, the LKA system determines whether there is a lane departure situation according to vehicle state data collected in real time, that is, a built-in departure steering control logic is configured to detect and process the vehicle state data to determine whether there is a lane departure situation. if there is a lane departure, the LKA system sends a handshake signal to the EPS system through the CAN bus. After receiving the handshake signal sent by the LKA system, the EPS system reads the vehicle configuration code pre-written in the EPS memory, and determines whether the LKA function identifier of the vehicle configuration code is the on identifier. If the LKA function identifier is the on identifier, it is indicated that the EPS system has enabled the LKA function and can communicate with the LKA system, that is, the handshake is successful. In this circumstance, the LKA interface identifier in the vehicle configuration code may be sent to the LKA system, so that the LKA system can identify the interface type capable of communicating with the EPS system. For example, if the LKA interface identifier is the angle interface identifier, it is indicated that the EPS system can communicate with the LKA system through the angle interface. If the LKA interface identifier is the torque interface identifier, it is indicated that the EPS system can communicate with the LKA system through the torque interface. After receiving the LKA interface identifier sent by the EPS system, the LKA system can call the deviation steering control logic corresponding to the interface type corresponding to the LKA interface identifier for processing, and obtain the corresponding expected control signal, that is, generate the expected angle signal and the expected torque signal, so as to effectively ensure the feasibility of a mutual communication between the LKA system and the EPS system, thereby ensuring that the compatibility verification is passed, and ensure the feasibility of subsequent control of the assist motor steering based on the target torque value determined by the expected control signal.

Figure 4:
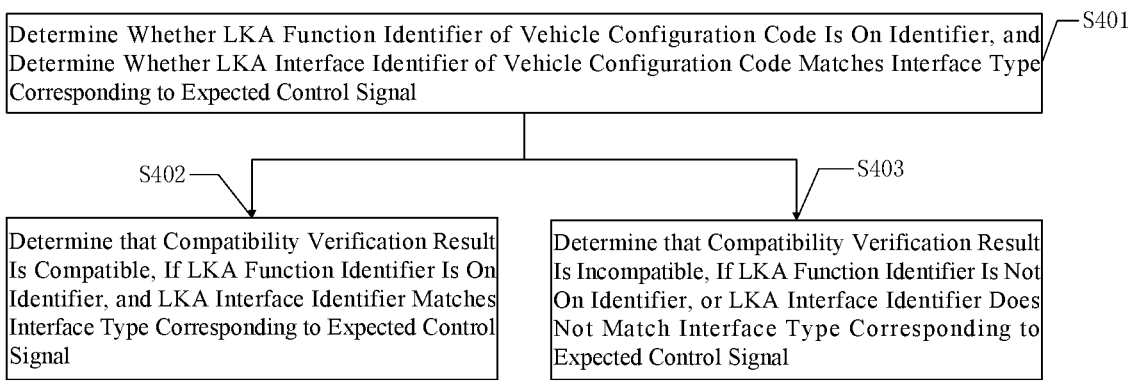
FIG. 4 is another flowchart of the electric power steering control method according to an embodiment of the present application.

In one embodiment, as shown in FIG. 4, performing the compatibility verification on the expected control signal based on the vehicle configuration code, and obtaining the compatibility verification result in step S202 specifically includes the following steps.

S401: whether the LKA function identifier of the vehicle configuration code is the on identifier is determined, and whether the LKA interface identifier of the vehicle configuration code matches the interface type corresponding to the expected control signal is determined.

S402: if the LKA function identifier is the on identifier, and the LKA interface identifier matches the interface type corresponding to the expected control signal, it is determined that the compatibility verification result is compatible.

S403: if the LKA function identifier is not the on identifier, or the LKA interface identifier does not match the interface type corresponding to the expected control signal, it is determined that the compatibility verification result is incompatible.

In this embodiment, after receiving the expected control signal, the EPS system obtains the pre-stored vehicle configuration code, and firstly determines whether the LKA function identifier of the vehicle configuration code is the on identifier. If the LKA function identifier is the on identifier, the LKA function of the EPS system is enabled, and it is indicated that the EPS system can communicate with the LKA system and accept the control of the LKA system. In this circumstance, whether the LKA interface identifier in the vehicle configuration code matches the interface type corresponding to the expected control signal. If the LKA function identifier is not the on identifier but an off identifier, the LKA function of the EPS system is not enabled, and it is indicated that the EPS system cannot communicate with the LKA system. In this circumstance, the EPS system is not controlled by the LKA system. Therefore, it can be directly determined that the compatibility verification result is incompatible, such that the EPS system does not perform subsequent steps of obtaining the target torque value according to the expected control signal, and controlling the assist motor steering based on the target torque value.

In an embodiment, after the EPS system determines whether the LKA interface identifier of the vehicle configuration code matches the interface type corresponding to the expected control signal, there are two determination results as follows. The one is that the LKA interface identifier matches the interface type corresponding to the expected control signal. In this circumstance, the LKA function of the EPS system is enabled, and the interface type of the EPS system is the same as the interface type of the LKA system, and the EPS system and the LKA system can interact, so that the EPS system can perform subsequent control operations according to the expected control signal of the LKA system. Therefore, the obtained compatibility verification result is compatible. The second is that the LKA interface identifier does not match the interface type corresponding to the expected control signal. In this circumstance, the LKA function of the EPS system is enabled, but the interface type of the EPS system and the interface type of the LKA system are different, and the EPS system and the LKA system cannot interact, so that the EPS system cannot perform subsequent control operations according to the expected control signal of the LKA system. Therefore, the obtained compatibility verification result is incompatible.

Figure 5:
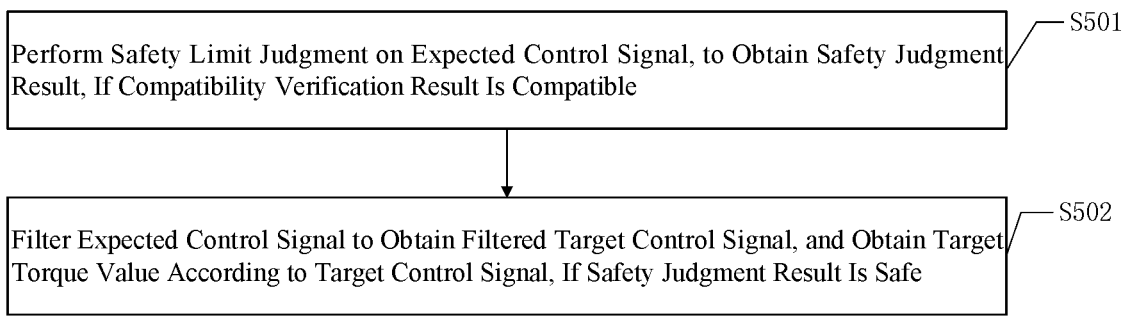
FIG. 5 is another flowchart of the electric power steering control method according to an embodiment of the present application.

In one embodiment, as shown in FIG. 5, obtaining the target torque value according to the expected control signal if the compatibility verification result is compatible in step S301 specifically includes the following steps.

S501: if the compatibility verification result is compatible, a safety limit judgment is performed on the expected control signal, to obtain a safety judgment result.

S502: if the safety judgment result is safe, the expected control signal is filtered to obtain a filtered target control signal, and the target torque value is obtained according to the target control signal.

When the compatibility verification result obtained by the EPS system in the compatibility verification is compatible, it is indicated that the interface type of the EPS system and the interface type of the LKA system are compatible, and the communication and interaction can be performed through an interface corresponding to the LKA interface identifier of the vehicle configuration code. The EPS system can control the assist motor steering according to the expected control signal of the LKA system. In this embodiment, when the compatibility verification result is compatible, the EPS firstly performs the safety limit judgment on the expected control signal, to determine whether the expected control signal matches a safety range corresponding to the interface type of the EPS, and obtain the safety judgment result. If the safety judgment result is safe, that is, the expected control signal matches the safety range corresponding to the interface type of the EPS, and it is indicated that the expected control signal is within the safety range that the EPS system can accept, and there is no fault or other abnormality. In this circumstance, the expected control signal is filtered to remove noise or other interference in the expected control signal, so as to obtain the filtered target control signal, so that the target torque value is obtained according to the target control signal, and the assist motor is controlled based on the target torque value, which helps to prevent jitter and ensures the smoothness of the control process. The target control signal is a signal formed by filtering the expected control signal when the safety judgment result is safe.

Figure 6:
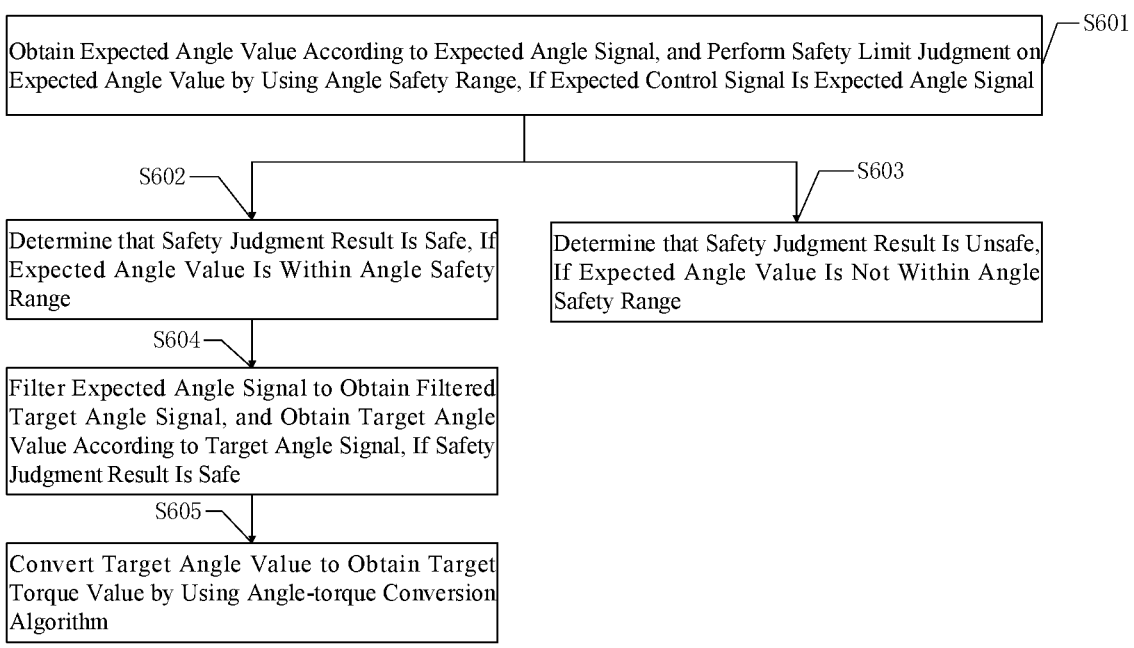
FIG. 6 is another flowchart of the electric power steering control method according to an embodiment of the present application.

In one embodiment, as shown in FIG. 6, obtaining the target torque value according to the expected control signal if the compatibility verification result is compatible in step S301 specifically includes the following steps.

S601: if the compatibility verification result is compatible and the expected control signal is the expected angle signal, the expected angle value is obtained according to the expected angle signal, and the safety limit of the expected angle value is determined by an angle safety range.

S602: if the expected angle value is within the angle safety range, it is determined that the safety judgment result is safe.

S603: if the expected angle value is not within the angle safety range, it is determined that the safety judgment result is unsafe.

S604: if the safety judgment result is safe, the expected angle signal is filtered to obtain a filtered target angle signal, and the target angle value is obtained according to the target angle signal.

S605: the target angle value is converted to obtain the target torque value by an angle-torque conversion algorithm.

In this embodiment, steps S601-S603 are a specific implementation of step S501, and steps S604-S605 are a specific implementation of step S502.

The angle safety range is a preset range configured to evaluate whether the angle value is safe, that is, whether it is an angle range that can be controlled by the EPS system.

In this embodiment, when the compatibility verification result of the EPS system is compatible and the received expected control signal is the expected angle signal, it is indicated that the EPS system can perform the subsequent operation of controlling the assist motor steering according to the expected angle signal of the LKA system. In order to ensure the reliability and accuracy of the control process, it is necessary to perform a safety limit processing and a filtering processing on the expected angle signal.

In an embodiment, performing the safety limit processing on the expected angle signal specifically includes the following steps. The EPS firstly obtains the corresponding expected angle value according to the expected angle signal, and then perform the safety limit judgment on the expected angle value by the angle safety range. If the expected angle value is within the angle safety range, it is indicated that the obtained expected angle value is a safe angle value that the EPS system can handle, and therefore, the safety judgment result is safe. If the expected angle value is not within the angle safety range, it is indicated that the obtained expected angle value is not a safe angle value that the EPS system can handle. In this circumstance, the EPS system sends an interrupt signal to the LKA system through the CAN bus and feeds back the interrupt reason, and no longer accepts a control of the LKA system.

In one embodiment, when the expected angle value is within the angle safety range and the safety judgment result is safe, the expected angle signal is filtered to obtain the filtered target angle signal, thereby achieving a purpose of filtering out high-frequency interference and preventing jitter. The filtered target angle signal is then processed to determine the target angle value corresponding to the filtered target angle signal, so that the target angle value is more accurate than the expected angle value. Then, the target angle value is converted to obtain the target torque value, and the assist motor steering is controlled according to the target torque value. Since the target torque value is a torque value obtained by performing the angle-torque conversion on the target angle value formed by the filtered target angle signal, the jitter can be effectively prevented, and the stability of the steering control process can be ensured while controlling the assist motor steering according to the target torque value.

Figure 7:
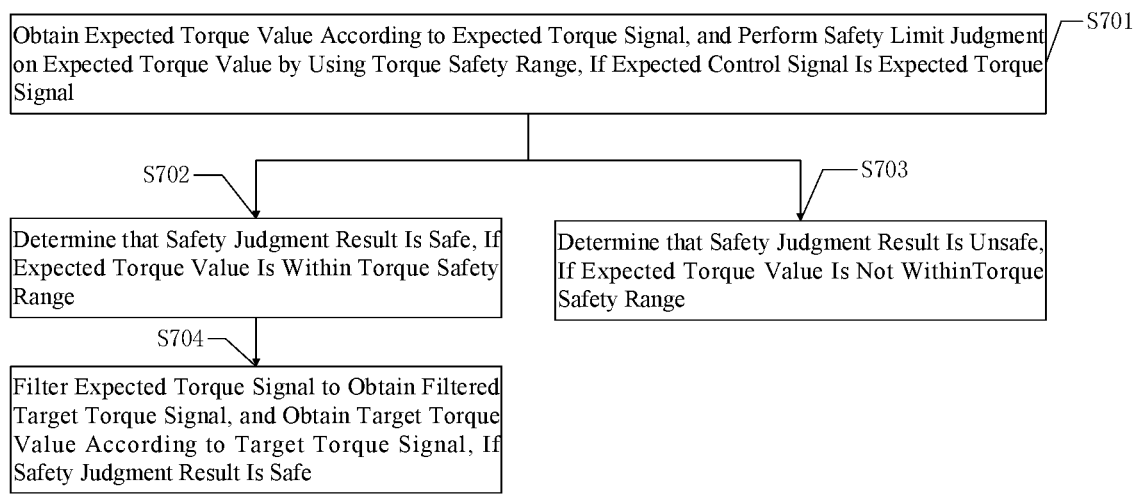
FIG. 7 is another flowchart of the electric power steering control method according to an embodiment of the present application.

In one embodiment, as shown in FIG. 7, obtaining the target torque value according to the expected control signal if the compatibility verification result is compatible in step S301 specifically includes the following steps.

S701: if the compatibility verification result is compatible and the expected control signal is the expected torque signal, the expected torque value is obtained according to the expected torque signal, and the safety limit judgment is performed on the expected torque value by the torque safety range.

S702: if the expected torque value is within the torque safety range, it is determined that the safety judgment result is safe.

S703: if the expected torque value is not within the torque safety range, it is determined that the safety judgment result is unsafe.

S704: if the safety judgment result is safe, the expected torque signal is filtered to obtain a filtered target torque signal, and the target torque value is obtained according to the target torque signal.

In this embodiment, steps S701-S703 are a specific implementation of step S501, and step S704 is a specific implementation of step S502.

The torque safety range is a preset range configured to evaluate whether the torque value is safe, that is, whether it is a torque range that can be controlled by the EPS system.

In this embodiment, when the compatibility verification result of the EPS system is compatible and the received expected control signal is the expected torque signal, it is indicated that the EPS system can perform the subsequent operation of controlling the assist motor steering according to the expected torque signal of the LKA system. In order to ensure the reliability and accuracy of the control process, it is necessary to perform a safety limit processing and a filtering processing on the expected torque signal.

In an embodiment, performing the safety limit processing on the expected torque signal specifically includes the following steps. The EPS firstly obtains the corresponding expected torque value according to the expected torque signal, and then the safety limit judgment is performed on the expected torque value by the torque safety range. If the expected torque value is within the torque safety range, it is indicated that the obtained expected torque value is a safe torque value that the EPS system can handle, and therefore, the safety judgment result is safe. If the expected torque value is not within the torque safety range, it is indicated that the obtained expected torque value is not a safe torque value that the EPS system can handle. In this circumstance, the EPS system sends an interrupt signal to the LKA system through the CAN bus and feedbacks an interrupt reason, and no longer accepts a control of the LKA system.

In an embodiment, when the expected torque value is within the torque safety range and the safety judgment result is safe, the expected torque signal is filtered to obtain the filtered target torque signal, thereby achieving a purpose of filtering out high-frequency interference and preventing jitter. Then, the filtered target torque signal is processed to determine the target torque value corresponding to the filtered target torque signal, so that the target torque value is compared with the expected torque value, and then the assist motor steering is controlled according to the target torque value. Since the target torque value is a torque value formed from the filtered target torque signal, the jitter can be effectively prevented and the stability of the steering control process can be ensured while controlling the assist motor steering according to the target torque value.

It should be understood that the sequence numbers of the steps in the above embodiments does not mean a sequence of execution, and an execution sequence of each process should be determined by its function and internal logic, and should not constitute any limitation to implementation processes of the embodiments of the present application.

In one embodiment, provided is an electric power steering system, including an EPS memory, a processor, and computer-readable instructions stored on the EPS memory and executable on the processor. When the processor executes the computer-readable instructions, the electric power steering control method in the embodiment is implemented, such as S201-S203 shown in FIG. 2, or shown in FIG. 3 to FIG. 7, which is not repeated herein to avoid repetition.

In one embodiment, a computer-readable storage medium is provided, and computer-readable instructions are stored on the computer-readable storage medium. When the computer-readable instructions are executed by the processor, the electric power steering control method in the above-mentioned embodiment is implemented, such as S201-S203 shown in FIG. 2, or shown in FIG. 3 to FIG. 7, which is not repeated herein to avoid repetition.

Those of ordinary skill in the art can understand that all or part of the processes in the methods of the above embodiments may be implemented by instructing the relevant hardware by computer-readable instructions, wherein the computer-readable instructions may be stored in a non-volatile computer readable storage medium. When the computer-readable instructions are executed, the processes of the above-described method embodiments can be performed. Any reference to EPS memory, storage, database or other medium used in the various embodiments provided in the present application may include non-volatile and/or volatile EPS memory. The non-volatile EPS memory may include read-only EPS memory (ROM), programmable ROM (PROM), electrically programmable ROM (EPROM), electrically erasable programmable ROM (EEPROM), or flash memory. The volatile EPS memory may include random access EPS memory (RAM) or external cache EPS memory. In way of illustration and not limitation, RAM is available in various forms such as static RAM (SRAM), dynamic RAM (DRAM), synchronous DRAM (SDRAM), double data rate SDRAM (DDRSDRAM), enhanced SDRAM (ES-DRAM), Synchlink DRAM (SLDRAM), EPS Rambus direct RAM (RDRAM), direct EPS Rambus dynamic RAM (DRDRAM), and EPS Rambus dynamic RAM (RDRAM).

Those skilled in the art can clearly understand that, for the convenience and simplicity of description, the division of the above-mentioned functional units and modules is only used as an example for illustration. In practical applications, the above-mentioned functions may be completed by different functional units or modules, that is, an internal structure of the device is divided into different functional units or modules to complete all or part of the functions described above.

The above-mentioned embodiments are only used to illustrate the technical solutions of the present application, but not to limit them. Although the present application has been described in detail with reference to the above-mentioned embodiments, those of ordinary skill in the art should understand that: it is still possible to modify the technical solutions recorded in the above-mentioned embodiments, or perform equivalent replacements to some of the technical features, and these modifications or replacements do not make the essence of the corresponding technical solutions deviate from the spirit of the technical solutions in the embodiments of the present application, and shall be included within the protection scope of the present application.

What is claimed is:

1. An electric power steering control method, executed by an EPS system, comprising:
    acquiring an expected control signal sent by a LKA system, wherein the expected control signal comprises an expected angle signal or an expected torque signal;
    performing a compatibility verification on the expected control signal based on a vehicle configuration code, and obtaining a compatibility verification result; and obtaining a target torque value according to the expected control signal, and controlling an assist motor steering based on the target torque value, if the compatibility verification result is compatible.

2. The electric power steering control method of claim 1, wherein performing the compatibility verification on the expected control signal based on the vehicle configuration code and obtaining the compatibility verification result comprises:
determining whether a LKA function identifier of the vehicle configuration code is an on identifier, and determining whether a LKA interface identifier of the vehicle configuration code matches an interface type corresponding to the expected control signal;
determining that the compatibility verification result is compatible, if the LKA function identifier is the on identifier, and the LKA interface identifier matches the interface type corresponding to the expected control signal; and
determining that the compatibility verification result is incompatible, if the LKA function identifier is not the on identifier, or the LKA interface identifier does not match the interface type corresponding to the expected control signal.

3. The electric power steering control method of claim 1, wherein obtaining the target torque value according to the expected control signal comprises:
obtaining an expected angle value according to the expected angle signal, and converting the expected angle value to obtain the target torque value, if the expected control signal is the expected angle signal.

4. The electric power steering control method of claim 1, wherein obtaining the target torque value according to the expected control signal comprises:
obtaining an expected torque value according to the expected torque signal, and determining the expected torque value as the target torque value, if the expected control signal is the expected torque signal.

5. The electric power steering control method of claim 1, wherein obtaining the target torque value according to the expected control signal if the compatibility verification result is compatible, comprises:
performing a safety limit judgment on the expected control signal, to obtain a safety judgment result, if the compatibility verification result is compatible; and
filtering the expected control signal to obtain a filtered target control signal, and obtaining the target torque value according to the target control signal, if the safety judgment result is safe.

6. The electric power steering control method of claim 5, wherein performing the safety limit judgment on the expected control signal to obtain the safety judgment result comprises:
obtaining an expected angle value according to the expected angle signal, and performing the safety limit judgment on the expected angle value by an angle safety range, if the expected control signal is the expected angle signal;
determining that the safety judgment result is safe, if the expected angle value is within the angle safety range; and
determining that the safety judgment result is unsafe, if the expected angle value is not within the angle safety range;
wherein the filtering the expected control signal to obtain the filtered target control signal, and obtaining the target torque value according to the target control signal, if the safety judgment result is safe comprises:
filtering the expected angle signal to obtain the filtered target angle signal, and obtaining the target angle value according to the target angle signal, if the safety judgment result is safe; and
converting the target angle value to obtain the target torque value by an angle-torque conversion algorithm.

7. The electric power steering control method of claim 5, wherein performing the safety limit judgment on the expected control signal to obtain the safety judgment result comprises:
obtaining the expected torque value according to the expected torque signal, and performing the safety limit judgment on the expected torque value by a torque safety range, if the expected control signal is the expected torque signal;
determining that the safety judgment result is safe, if the expected torque value is within the torque safety range; and
determining that the safety judgment result is unsafe, if the expected torque value is not within the torque safety range;
wherein the filtering the expected control signal to obtain the filtered target control signal, and obtaining the target torque value according to the target control signal, if the safety judgment result is safe comprises:
filtering the expected torque signal to obtain the filtered target torque signal, and obtaining the target torque value according to the target torque signal, if the safety judgment result is safe.

8. The electric power steering control method of claim 1, wherein obtaining the expected control signal sent by the LKA system comprises:
obtaining a handshake signal sent by the LKA system, and sending a LKA interface identifier of the vehicle configuration code to the LKA system if the LKA function identifier of the vehicle configuration code is an on identifier; and
obtaining the expected control signal formed by the LKA system based on the LKA interface identifier.

9. An electric power steering system, comprising:
an EPS memory;
a processor; and
computer-readable instructions stored in the EPS memory and executed on the processor;
wherein when the processor executes the computer-readable instructions, the following steps are implemented:
acquiring an expected control signal sent by a LKA system, wherein the expected control signal comprises an expected angle signal or an expected torque signal;
performing a compatibility verification on the expected control signal based on a vehicle configuration code, and obtaining a compatibility verification result; and
obtaining a target torque value according to the expected control signal, and controlling an assist motor steering based on the target torque value, if the compatibility verification result is compatible.

10. The electric power steering system of claim 9, wherein performing the compatibility verification on the expected control signal based on the vehicle configuration code and obtaining the compatibility verification result, comprises:
determining whether a LKA function identifier of the vehicle configuration code is an on identifier, and determining whether a LKA interface identifier of the vehicle configuration code matches an interface type corresponding to the expected control signal;

determining that the compatibility verification result is compatible, if the LKA function identifier is the on identifier, and the LKA interface identifier matches the interface type corresponding to the expected control signal; and determining that the compatibility verification result is incompatible, if the LKA function identifier is not the on identifier, or the LKA interface identifier does not match the interface type corresponding to the expected control signal.

11. The electric power steering system of claim 9, wherein obtaining the target torque value according to the expected control signal comprises:

obtaining an expected angle value according to the expected angle signal, and converting the expected angle value to obtain the target torque value, if the expected control signal is the expected angle signal;

obtaining an expected torque value according to the expected torque signal, and determining the expected torque value as the target torque value, if the expected control signal is the expected torque signal.

12. The electric power steering system of claim 9, wherein obtaining the target torque value according to the expected control signal if the compatibility verification result is compatible, comprises:

performing a safety limit judgment on the expected control signal, to obtain a safety judgment result, if the compatibility verification result is compatible; and filtering the expected control signal to obtain a filtered target control signal, and obtaining the target torque value according to the target control signal, if the safety judgment result is safe.

13. The electric power steering system of claim 11, wherein performing the safety limit judgment on the expected control signal to obtain a safety judgment result, comprises:

obtaining an expected angle value according to the expected angle signal, and performing the safety limit judgment on the expected angle value by an angle safety range, if the expected control signal is the expected angle signal;

determining that the safety judgment result is safe, if the expected angle value is within the angle safety range; and determining that the safety judgment result is unsafe, if the expected angle value is not within the angle safety range;

filtering the expected control signal to obtain the filtered target control signal, and obtaining the target torque value according to the target control signal, if the safety judgment result is safe, comprises:

filtering the expected angle signal to obtain the filtered target angle signal, and obtaining the target angle value according to the target angle signal, if the safety judgment result is safe; and converting the target angle value to obtain the target torque value by an angle-torque conversion algorithm.

14. The electric power steering system of claim 11, wherein performing the safety limit judgment on the expected control signal to obtain the safety judgment result comprises:

obtaining the expected torque value according to the expected torque signal, and performing the safety limit judgment on the expected torque value by a torque safety range, if the expected control signal is the expected torque signal;

determining that the safety judgment result is safe, if the expected torque value is within the torque safety range; and determining that the safety judgment result is unsafe, if the expected torque value is not within the torque safety range;

wherein the filtering the expected control signal to obtain the filtered target control signal, and obtaining the target torque value according to the target control signal, if the safety judgment result is safe comprises:

filtering the expected torque signal to obtain the filtered target torque signal, and obtaining the target torque value according to the target torque signal, if the safety judgment result is safe.

15. A non-transitory computer-readable storage medium, having stored therein computer-readable instructions, wherein when the computer-readable instructions are executed by one or more processors, the one or more processors perform the following steps:

acquiring an expected control signal sent by a LKA system, wherein the expected control signal comprises an expected angle signal or an expected torque signal;

performing a compatibility verification on the expected control signal based on a vehicle configuration code, and obtaining a compatibility verification result; and obtaining a target torque value according to the expected control signal, and controlling an assist motor steering based on the target torque value, if the compatibility verification result is compatible.

16. The non-transitory computer-readable storage medium of claim 15, wherein performing the compatibility verification on the expected control signal based on the vehicle configuration code and obtaining the compatibility verification result, comprises:

determining whether a LKA function identifier of the vehicle configuration code is an on identifier, and determining whether a LKA interface identifier of the vehicle configuration code matches an interface type corresponding to the expected control signal;

determining that the compatibility verification result is compatible, if the LKA function identifier is the on identifier, and the LKA interface identifier matches the interface type corresponding to the expected control signal; and determining that the compatibility verification result is incompatible, if the LKA function identifier is not the on identifier, or the LKA interface identifier does not match the interface type corresponding to the expected control signal.

17. The non-transitory computer-readable medium of claim 15, wherein obtaining the target torque value according to the expected control signal comprises:

obtaining an expected angle value according to the expected angle signal, and converting the expected angle value to obtain the target torque value, if the expected control signal is the expected angle signal; and obtaining an expected torque value according to the expected torque signal, and determining the expected torque value as the target torque value, if the expected control signal is the expected torque signal.

18. The non-transitory computer-readable medium of claim 15, wherein obtaining the target torque value according to the expected control signal if the compatibility verification result is compatible, comprises:

performing a safety limit judgment on the expected control signal, to obtain a safety judgment result, if the compatibility verification result is compatible; and performing a filtering on the expected control signal, obtaining a filtered target control signal, and obtaining the target torque value according to the target control signal, if the safety judgment result is safe.

19. The non-transitory computer-readable storage medium of claim 18, wherein performing the safety limit judgment on the expected control signal to obtain the safety judgment result comprises:

obtaining an expected angle value according to the expected angle signal, and performing the safety limit judgment on the expected angle value by an angle safety range, if the expected control signal is the expected angle signal;

determining that the safety judgment result is safe, if the expected angle value is within the angle safety range; and determining that the safety judgment result is unsafe, if the expected angle value is not within the angle safety range;

wherein the filtering the expected control signal to obtain the filtered target control signal, and obtaining the target torque value according to the target control signal, if the safety judgment result is safe, comprises:

filtering the expected angle signal to obtain the filtered target angle signal, and obtaining the target angle value according to the target angle signal, if the safety judgment result is safe; and converting the target angle value to obtain the target torque value by an angle-torque conversion algorithm.

20. The non-transitory computer-readable storage medium of claim 18, wherein performing the safety limit judgment on the expected control signal to obtain the safety judgment result comprises:

obtaining the expected torque value according to the expected torque signal, and performing the safety limit judgment on the expected torque value by a torque safety range, if the expected control signal is the expected torque signal;

determining that the safety judgment result is safe, if the expected torque value is within the torque safety range; and determining that the safety judgment result is unsafe, if the expected torque value is not within the torque safety range;

filtering the expected control signal to obtain the filtered target control signal, and obtaining the target torque value according to the target control signal, if the safety judgment result is safe, comprises:

filtering the expected torque signal to obtain the filtered target torque signal, and obtaining the target torque value according to the target torque signal, if the safety judgment result is safe.

* * * * *